(12) United States Patent
Fang et al.

(10) Patent No.: US 11,460,887 B2
(45) Date of Patent: Oct. 4, 2022

(54) DISPLAY DEVICE AND TERMINAL DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Liyu Fang, Beijing (CN); Xiuyun Chen, Beijing (CN); Lingyu Sun, Beijing (CN); Fei Liang, Beijing (CN); Jingjun Du, Beijing (CN); Tingxiu Hou, Beijing (CN); Peng Zhong, Beijing (CN); Jian Zhao, Beijing (CN)

(73) Assignees: BEIJING BOE OPTOELECTRONICS TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 127 days.

(21) Appl. No.: 16/804,874

(22) Filed: Feb. 28, 2020

(65) Prior Publication Data

US 2021/0157365 A1    May 27, 2021

(30) Foreign Application Priority Data

Nov. 27, 2019 (CN) .......................... 201922084250.9

(51) Int. Cl.
| | |
|---|---|
| G06F 1/00 | (2006.01) |
| G06F 1/16 | (2006.01) |
| H04M 1/02 | (2006.01) |
| G06F 3/14 | (2006.01) |
| G04G 17/04 | (2006.01) |

(52) U.S. Cl.
CPC ............ G06F 1/1649 (2013.01); G06F 1/163 (2013.01); G06F 1/1616 (2013.01); G06F 3/1423 (2013.01); H04M 1/0216 (2013.01); H04M 1/0264 (2013.01); H04M 1/0266 (2013.01); G04G 17/045 (2013.01); G06F 1/1686 (2013.01); H04M 2250/16 (2013.01)

(58) Field of Classification Search
None
See application file for complete search history.

(56) References Cited

U.S. PATENT DOCUMENTS

| | | | |
|---|---|---|---|
| 10,536,566 B1 * | 1/2020 | Cheng | H04M 1/0216 |
| 2012/0105487 A1 * | 5/2012 | Son | G06F 3/011 |
| | | | 345/671 |
| 2013/0076597 A1 * | 3/2013 | Becze | G02B 6/0001 |
| | | | 345/1.3 |
| 2017/0075474 A1 * | 3/2017 | Shigematsu | G06F 3/0485 |

(Continued)

*Primary Examiner* — Michael A Faragalla
(74) *Attorney, Agent, or Firm* — Collard & Roe, P.C.

(57) ABSTRACT

A display device and a terminal device are disclosed. The display device includes a main body and a cover body rotatably connected to the main body, the main body includes a first display screen on a side, close to the cover body, of the main body, the cover body is provided with an accommodating cavity penetrating through the cover body in a direction perpendicular to the first display screen, the cover body includes a second display screen in the accommodating cavity, the second display screen is stacked on the first display screen in the direction perpendicular to the first display screen, and the second display screen is a transparent display screen.

19 Claims, 4 Drawing Sheets

(56) References Cited

U.S. PATENT DOCUMENTS

2019/0253542 A1* 8/2019 Fan .................... H04M 1/0237
2020/0190877 A1* 6/2020 Zhai ..................... G06F 1/1632
2020/0372875 A1* 11/2020 Iyer ...................... G06F 3/0482

* cited by examiner

DISPLAY DEVICE AND TERMINAL DEVICE

CROSS-REFERENCE TO RELATED APPLICATION

The present application claims the priority of Chinese patent application No. 201922084250.9 filed on Nov. 27, 2019, and the entire content disclosed by the Chinese patent application is incorporated herein by reference as part of the present application for all purposes under the U.S. law.

TECHNICAL FIELD

Embodiments of the present disclosure relate to the field of display technology, in particular relate to a display device and a terminal device.

BACKGROUND

At present, a dual-screen display solution has begun to appear in the market and are increasingly sought after by consumers. The dual-screen display solution is a technical solution that uses two display screens for display on an electronic device. In a dual-screen display solution applied to a bar phone, the two display screens are generally provided on two surfaces (for example, front and back), which are opposite to each other, of the bar phone, thereby implementing the dual-screen display solution.

SUMMARY

An embodiment of the present disclosure provides a display device, and the display device comprises a main body and a cover body rotatably connected to the main body. The main body comprises a first display screen on a side, close to the cover body, of the main body, the cover body is provided with an accommodating cavity penetrating through the cover body in a direction perpendicular to the first display screen, the cover body comprises a second display screen in the accommodating cavity, the second display screen is stacked on the first display screen in the direction perpendicular to the first display screen, and the second display screen is a transparent display screen.

For example, the display device provided by an embodiment of the present disclosure further comprises a controller. The controller is provided on the main body, the controller is in communication with the first display screen and the second display screen, and the controller is configured to control the first display screen and the second display screen to be able to display different contents, respectively.

For example, the display device provided by an embodiment of the present disclosure further comprises a camera provided on the main body, a through hole is formed on the cover body at a position corresponding to the camera, and the through hole exposes the camera.

For example, in the display device provided by an embodiment of the present disclosure, a shape of the through hole matches a shape of the camera, and a size of the through hole is larger than a size of the camera.

For example, in the display device provided by an embodiment of the present disclosure, a display region of the first display screen comprises a main display region, and in a case where the cover body is covered on the main body, an orthographic projection of a display region of the second display screen on the main body at least partially overlaps with the main display region.

For example, in the display device provided by an embodiment of the present disclosure, in the case where the cover body is covered on the main body, an orthographic projection of an outer periphery of the display region of the second display screen on the main body is located outside an outer periphery of the main display region of the first display screen.

For example, in the display device provided by an embodiment of the present disclosure, a shape of the display region of the second display screen is the same as a shape of the main display region of the first display screen.

For example, in the display device provided by an embodiment of the present disclosure, the cover body is pivotally connected to the main body.

For example, in the display device provided by an embodiment of the present disclosure, the cover body is pivotally connected to the main body through a damping shaft.

For example, in the display device provided by an embodiment of the present disclosure, the damping shaft comprises a shaft sleeve mounted on one of the cover body and the main body and a shaft core mounted on the other of cover body and the main body, the shaft sleeve is rotatably sleeved with the shaft core, and the shaft sleeve forms an interference fit with the shaft core.

For example, in the display device provided by an embodiment of the present disclosure, the main body is further provided with stop blocks, the stop blocks are located on both sides of the shaft core to encapsulate the shaft core inside the main body.

For example, in the display device provided by an embodiment of the present disclosure, a material of the stop blocks is the same as a material of the main body.

For example, in the display device provided by an embodiment of the present disclosure, the cover body is rotated relative to the main body in the direction perpendicular to the first display screen, or the cover body is rotated relative to the main body in a direction parallel to the first display screen.

For example, in the display device provided by an embodiment of the present disclosure, a rotation angle of the cover body relative to the main body is from 0° to 180°.

For example, in the display device provided by an embodiment of the present disclosure, a rotation angle of the cover body relative to the main body is from 0° to 360°.

For example, in the display device provided by an embodiment of the present disclosure, a material of the cover body is the same as a material of the main body.

For example, the display device provided by an embodiment of the present disclosure further comprises a circuit board, the circuit board is in the main body, and the first display screen and the second display screen are both electrically connected to the circuit board.

For example, in the display device provided by an embodiment of the present disclosure, a display region of the first display screen comprises a main display region, and in a case where the cover body is covered on the main body, an orthographic projection of a display region of the second display screen on the main body at least partially overlaps with the main display region.

An embodiment of the present disclosure provides a terminal device, and the terminal device comprises a display device, the display device comprises a main body and a cover body rotatably connected to the main body, the main body comprises a first display screen on a side, close to the cover body, of the main body, the cover body is provided with an accommodating cavity penetrating through the cover body in a direction perpendicular to the first display screen, and the cover body comprises a second display screen in the accommodating cavity, the second display screen is stacked on the first display screen in the direction perpendicular to the first display screen, and the second display screen is a transparent display screen.

For example, in the terminal device provided by an embodiment of the present disclosure, the terminal device is a wearable device.

BRIEF DESCRIPTION OF DRAWINGS

In order to clearly illustrate the technical solutions of the embodiments of the disclosure, the drawings required for describing the embodiments will be briefly described in the following; it is obvious that the described drawings are only related to some embodiments of the present disclosure and thus are not limitative to the present disclosure.

Figure 1:
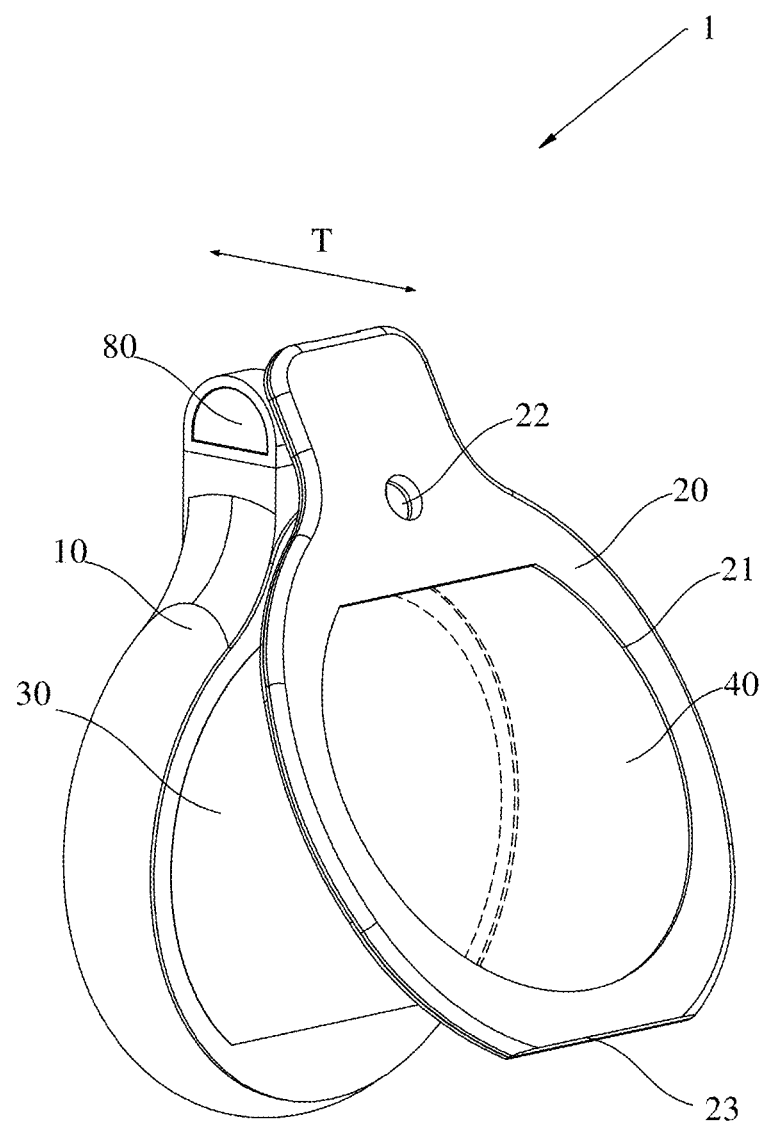
FIG. 1 is a schematic diagram of a three-dimensional structure of a display device provided by an exemplary embodiment of the present disclosure.

REFERENCE NUMBER display device 1; main body 10; cover body 20; accommodating cavity 21; through hole 22; notch 23; first display screen 30; second display screen 40; camera 50; damping shaft 60; shaft core 61; shaft sleeve 62; connecting member 70; stop block 80; thickness direction T

DETAILED DESCRIPTION

Exemplary embodiments will be described in detail here, and the exemplary embodiments are shown in the drawings. In the case where the following description refers to the accompanying drawings, the same numbers in different drawings represent the same or similar elements unless otherwise indicated. The implementations described in the following exemplary embodiments do not represent all implementations consistent with the present disclosure. Rather, the implementations are merely examples of devices consistent with some aspects of the present disclosure, as detailed in the appended claims.

The terms used in the present disclosure is for the purpose of describing particular embodiments and is not intended to limit the present disclosure. Unless otherwise defined, all the technical and scientific terms used in the present disclosure have the same meanings as commonly understood by one of ordinary skill in the art to which the present disclosure belongs. The words "a/an", "one" or the like used in the specification and the claims of the present disclosure do not indicate a limitation on quantity, but rather indicate that there is at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. The term "a plurality of" or "multiple" includes two, which is equivalent to at least two. The singular forms "a" and "the" used in the specification and the appended claims of the present disclosure are also intended to include the plural forms unless the context clearly indicates otherwise. It should further be understood that the term "and/or" as used herein refers to and includes any or all possible combinations of one or more of the associated listed items.

For the dual-screen display solution applied to a flip phone or a wearable display device, users generally cannot directly see the display screen under the cover body of the flip phone or the wearable display device, and the display screen under the cover body can only be seen after the cover body is opened, which causes inconvenience to the user.

Embodiments of the present disclosure provide a display device and a terminal device. The display device includes a main body and a cover body rotatably connected to the main body. The main body comprises a first display screen on a side, close to the cover body, of the main body, the cover body is provided with an accommodating cavity penetrating through the cover body in a direction perpendicular to the first display screen, the cover body comprises a second display screen in the accommodating cavity, the second display screen is stacked on the first display screen in the direction perpendicular to the first display screen, and the second display screen is a transparent display screen.

In the display device provided by the embodiment of the present disclosure, the second display screen on the cover body is set as a transparent display screen, so the first display screen under the cover body can be seen through the second display screen, thereby achieving an effect of convenience, and improving user experience. And in some embodiments, the first display screen and the second display screen display different contents simultaneously, which can display more effective content to bring a better user experience.

The display device according to the embodiment of the present disclosure is described below with reference to FIG. 1 to FIG. 5.

Figure 2:
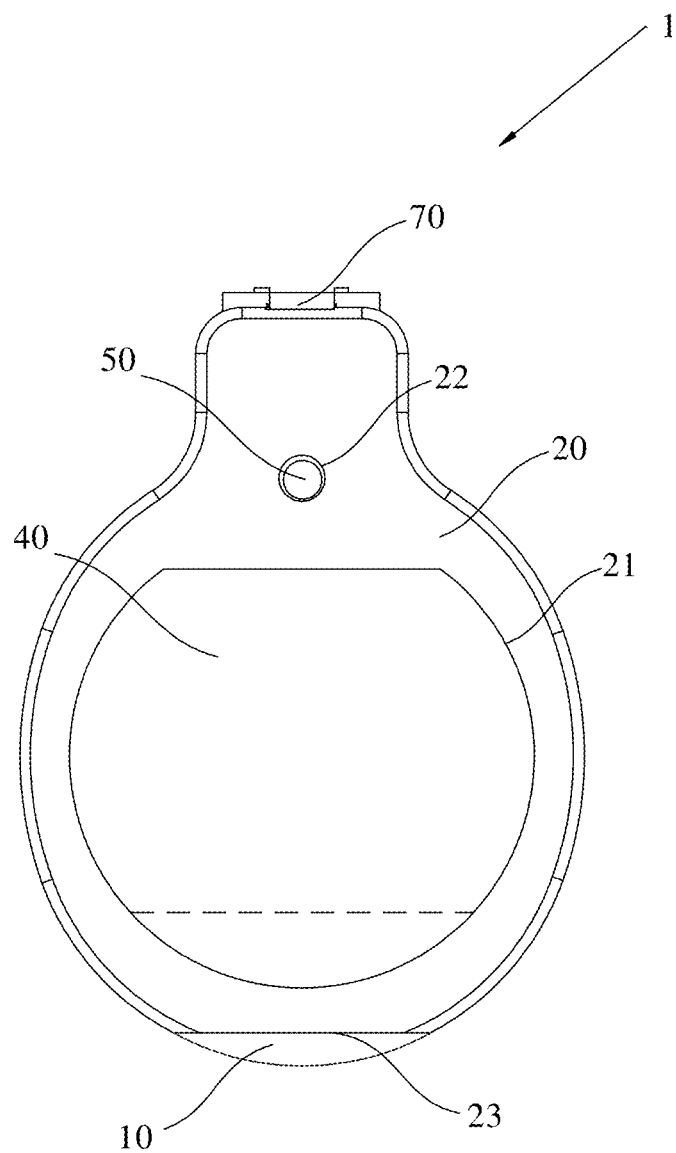
FIG. 2 is a schematic structural diagram of a display device in a case where a cover body of the display device is covered on a main body of the display device according to an exemplary embodiment of the present disclosure.

For example, as shown in FIG. 1, an embodiment of the present disclosure provides a display device 1. The display device 1 includes a main body 10 and a cover body 20. The cover body 20 is rotatably connected to the main body 10. The main body 10 comprises a first display screen 30 on a side, close to the cover body 20, of the main body 10. The cover body 20 is provided with an accommodating cavity 21 penetrating through the cover body 20 along a thickness direction T of the display device 1, that is, a direction perpendicular to the first display screen 30. The cover body 20 comprises a second display screen 40 disposed in the accommodating cavity 21. The second display screen 40 is stacked on the first display screen 30 in the thickness direction T. In the case where the cover body 20 is covered on the main body 10, that is, in the case as shown in FIG. 2, an orthographic projection of a display region of the second display screen 40 on the main body 10 at least partially overlaps with a display region of the first display screen 30. The second display screen 40 is a transparent display screen. It should be noted that, in the embodiments of the present disclosure, the transparent display screen indicates that the transparent display screen can display and can further project the light from a back side, so that a user on a display side can at least partially see the object on the back side, and the back side and the display side of the transparent display screen are two sides opposite to each other. For example, in the embodiments of the present disclosure, the second display screen 40 can display, and can further project the light from the first display screen 30 at the same time, so that the user on the display side (that is, a side of the second display screen 40 away from the first display screen 30) can at least partially see the content displayed on the first display screen 30 through the second display screen 40.

In the display device 1 provided by the embodiment of the present disclosure, the second display screen 40 on the cover body 20 is set as a transparent display screen, so the first display screen 30 under the cover body 20 can be seen through the second display screen 40, thereby achieving an effect of convenience use, and improving user experience.

For example, in some embodiments, the display device 1 further includes a controller (not shown in the drawings). The controller is configured to provide driving signals for the first display screen 30 and the second display screen 40, thereby driving the first display screen 30 and the second display screen 40 to perform display. The controller is disposed on the main body 10, and the controller is in communication with the first display screen 30 and the second display screen 40 through a bus or the like. The controller is configured to control the first display screen 30 and the second display screen 40 to be able to display different contents.

Figure 5:
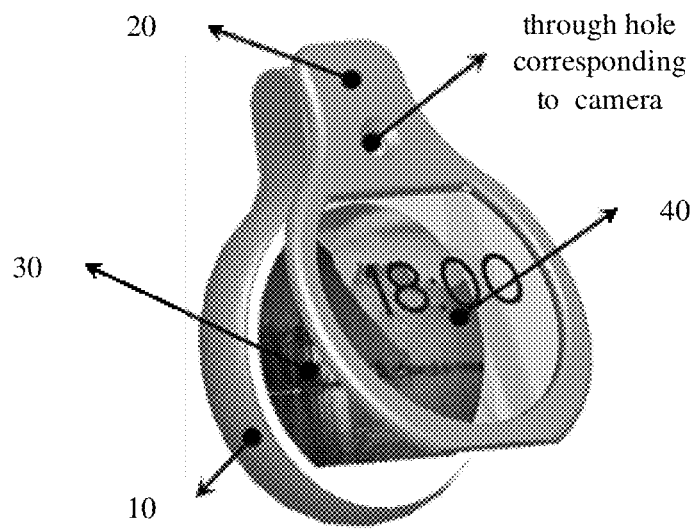
FIG. 5 is a schematic diagram when a display device performs display according to an exemplary embodiment of the present disclosure.

For example, the display content of the first display screen 30 is different from the display content of the second display screen 40. As shown in FIG. 5, in some embodiments, the first display screen 30 may display a photo, for example, a landscape image, and the second display screen 40 displays information such as a clock. The first display screen 30 and the second display screen 40 can display different contents simultaneously, thereby displaying more effective content to bring a better user experience and increasing display diversity.

It should be noted that, in some embodiments, the display content of the first display screen 30 and the display content of the second display screen 40 may be the same. In some embodiments, only the first display screen 30 or the second display screen 40 may perform the display.

For example, the first display screen 30 is a highlight display screen, so that in the case where the second display screen 40 is stacked on the first display screen 30 in the thickness direction T, the display content on the first display screen 30 can be more clearly viewed by the user through the second display screen 40.

For example, in some embodiments, the material of the cover body 20 is the same as the material of the main body 10, so that the color of the main body 10 and the color of the cover body 20 can be uniform as a whole, thereby causing the display device 1 to be more beautiful.

For example, the display device 1 further includes a camera 50 disposed on the main body 10, and a through hole 22 is formed on the cover body 20 at a position corresponding to the camera 50 to avoid the camera 50 on the main body 10, that is, the through hole 22 can expose the camera 50.

For example, in some embodiments, the cover body 20 may further be provided with a cover plate. The cover plate may cover the through hole, that is, the through hole may be closed by the cover plate or the like to prevent particles such as dust from falling on the camera 50, thereby protecting the camera 50. For another example, a camera may further be provided on the cover body 20, so in the case where the cover body 20 is covered on the main body 10, the camera on the cover body 20 may be used as a front-facing camera to implement a shooting function; and in the case where the cover body 20 is opened relative to the main body 10, the camera on the cover body 20 may be used as a rear-facing camera to implement the shooting function.

For example, in some embodiments, a shape of the through hole 22 matches a shape of the camera 50, and a size of the through hole 22 is larger than a size of the camera 50. In the embodiments as shown in FIG. 1 to FIG. 4, a shape of a cross section of the through hole 22 in a direction parallel to the first display screen 30 and a shape of a cross section of the camera 50 in the direction parallel to the first display screen 30 are both circular, but the present disclosure is not limited thereto, and the shape of the cross section of the through hole 22 in the direction parallel to the first display screen 30 may further be a suitable regular or irregular shape such as a square, a rectangle, or an ellipse.

For example, the display region of the first display screen 30 includes a main display region. In the case where the cover body 20 is covered on the main body 10, that is, in the case as shown in FIG. 2, an orthographic projection of a display region of the second display screen 40 on the main body 10 at least partially overlaps with the main display region of the first display screen 30. For example, the orthographic projection of the display region of the second display screen 40 on the main body 10 completely covers the main display region of the first display screen 30, that is, as shown in FIG. 2, in the case where the cover body 20 is covered on the main body 10, an orthographic projection of an outer periphery of the display region of the second display screen 40 on the main body 10 is located outside an outer periphery of the main display region of the first display screen 30. The main display region is a display region that can be seen through the second display screen 40, and can be adjusted according to design requirements. In the present embodiment, the entire display screen of the first display screen 30 is a display region, and the entire display screen of the first display screen 30 is the main display region, that is, the display region of the first display screen 30 is the main display region, the entire display screen of the second display screen 40 is a display region, and the outer periphery of the entire display screen of the second display screen 40 is located outside the outer periphery of the entire display screen of the first display screen 30. In other embodiments, according to the design requirements, the main display region may be a partial region of the display region of the first display screen 30, and the outer periphery of the second display screen 40 is located outside the outer periphery of the partial region, so that the display content of the main display region can be seen through the second display screen 40.

Figure 3:
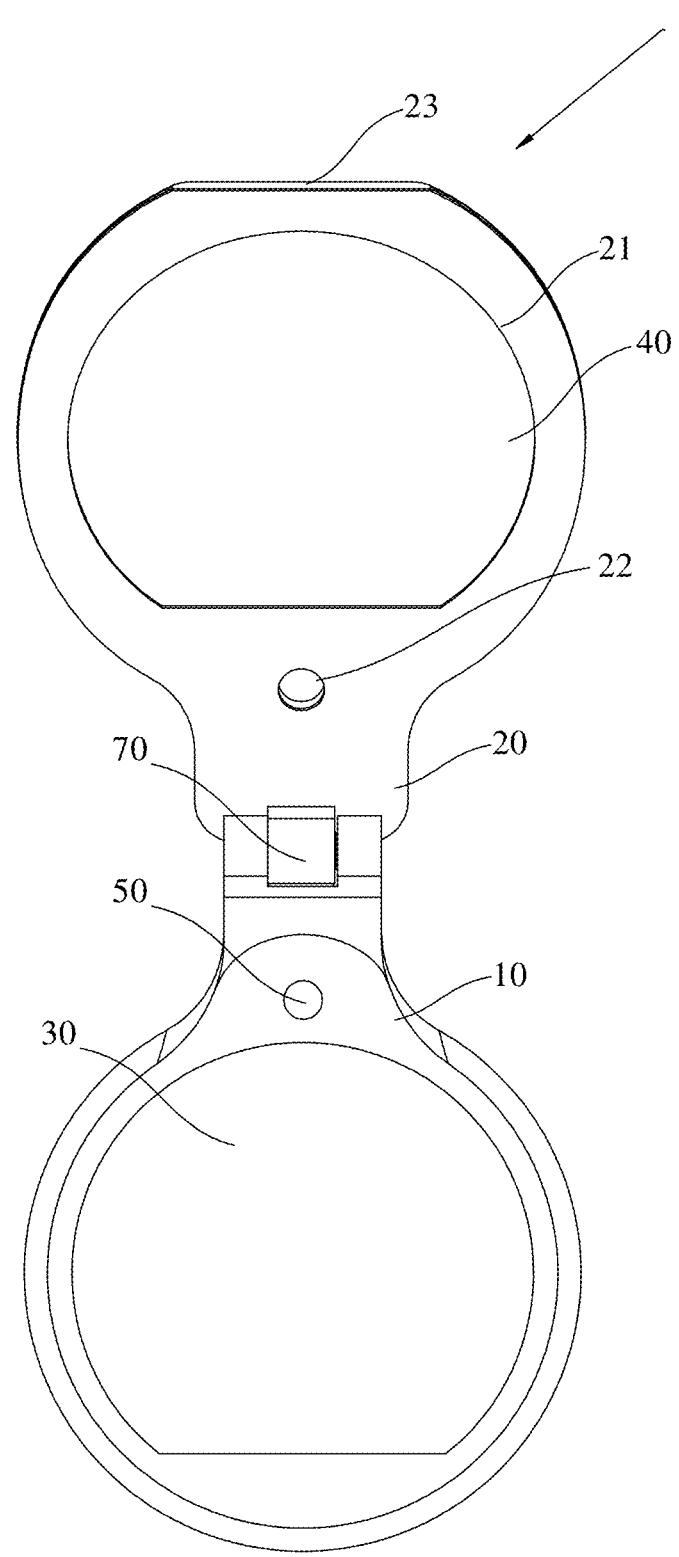
FIG. 3 is a schematic structural diagram of a display device in a case where a cover body of the display device is opened according to an exemplary embodiment of the present disclosure.

For example, in some embodiments, a shape of the display region of the second display screen 40 is the same as a shape of the main display region of the first display screen 30. In the example as shown in FIG. 3, the shape of the display region of the second display screen 40 is arcuate, and the shape of the main display region of the first display screen 30 is arcuate, but the present disclosure is not limited thereto. The shape of the display region of the second display screen 40 and the shape of the main display region of the first display screen 30 may also be rectangular, circular, or the like. A size of the display region of the second display screen 40 may be the same as a size of the main display region of the first display screen 30. For another example, in other embodiments, the shape of the display region of the second display screen 40 and the shape of the main display region of the first display screen 30 may be different. For example, the shape of the display region of the second display screen 40 is rectangular, and the shape of the main display region of the first display screen 30 is circular. It should be noted that the first display screen 30 and the second display screen 40 may be rectangular display screens, circular display screens, oval display screens, or polygonal display screens. In addition, the first display screen 30 and the second display screen 40 may be not only flat display screens, but also curved display screens or even spherical display screens.

For example, the cover body 20 is pivotally connected to the main body 10 to achieve the opening and closing of the second display screen 40 relative to the first display screen 30.

For example, the cover body 20 is rotated relative to the main body 10 in a direction perpendicular to the first display screen 30, that is, the thickness direction T, or the cover body 20 is rotated relative to the main body 10 in a direction parallel to the first display 30, that is, the cover body 20 can rotate relative to the main body 10 in a plane parallel to the first display screen 30.

For example, in some embodiments, the opening-and-closing angle of the second display screen 40 relative to the first display screen 30 is from 0° to 180°, that is, the rotation angle of the cover body 20 relative to the main body 10 is from 0° to 180°.

For example, in other embodiments, the opening-and-closing angle of the second display screen 40 relative to the first display screen 30 is from 0° to 360°, that is, the rotation angle of the cover body 20 relative to the main body 10 is from 0° to 360°.

Figure 4:
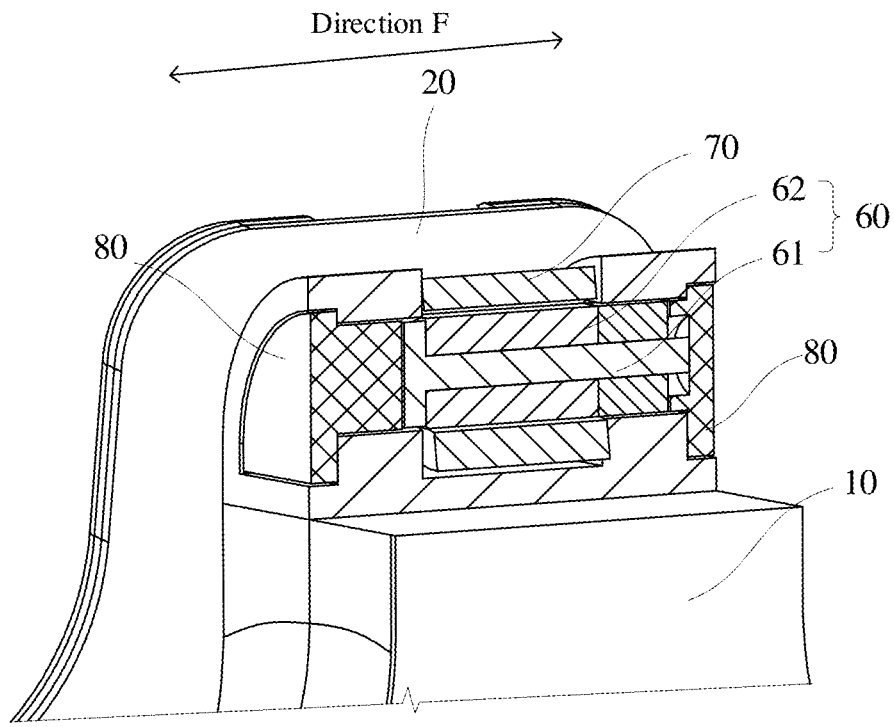
FIG. 4 is a schematic diagram of a partial cross-sectional structure of a display device according to an exemplary embodiment of the present disclosure.

For example, as shown in FIG. 4, the cover body 20 is pivotally connected to the main body 10 through a damping shaft 60. In this way, by providing the damping shaft 60, when the cover body 20 is rotated relative to the main body 10, for example, when the cover body 20 is turned or rotated, the cover body 20 can be stopped at any position within the range of the rotation angle (that is, 0° to 180° or 0° to 360° described above), thereby improving the convenience for the user and improving the comfort of the user experience.

It should be noted that the shaft for connecting the cover body 20 and the main body 10 may be, for example, a shaft that can be applied to a notebook, a flip phone, or the like, and the present disclosure does not specifically limit this.

For example, in some embodiments, the cover body 20 is rotated relative to the main body 10 in the thickness direction T. In this case, as shown in FIG. 4, the damping shaft 60 includes a shaft sleeve 62 mounted on one of the cover body 20 and the main body 10 and a shaft core 61 mounted on the other of cover body 20 and the main body 10, for example, the shaft sleeve 62 is mounted on the cover body 20, and the shaft core 61 is mounted on the main body 10; or, the shaft sleeve 62 is mounted on the main body 10, and the shaft core 61 is mounted on the cover body 20. The shaft sleeve 62 is rotatably sleeved with the shaft core 61, and the shaft sleeve 62 forms an interference fit with the shaft core 61. In this way, the damping rotation is achieved by a frictional force during the rotation between the shaft sleeve 62 and the shaft core 61, to improve the convenience for the user and improve the comfort of the user experience. The present disclosure is not limited to this, in some embodiments, the shaft sleeve 62 and the shaft core 61 may also implement the damping rotation through a snap fit. For example, a plurality of protrusions are provided on the surface of the shaft core 61 along a circumferential direction of the shaft core 61, a plurality of grooves that match with the plurality of protrusions are provided inside the shaft sleeve 62, and the protrusions are stuck in the grooves to form the snap fit. Alternatively, a plurality of grooves may be provided on the surface of the shaft core 61 along the circumferential direction, a plurality of protrusions that match with the plurality of grooves are provided inside the shaft sleeve 62, and the protrusions are stuck in the grooves to form the snap fit.

It should be noted that the cover body 20 may also be connected to the main body 10 through other suitable connection methods (for example, a hinge, etc.).

For example, the shaft sleeve 62 is clamped in a connecting member 70 fixedly connected to the cover body 20. When the cover body 20 is opened or closed, the shaft sleeve 62 drives the connecting member 70 to rotate synchronously with the cover body 20.

The main body 10 is further provided with stop blocks 80, and the stop blocks 80 are located on both outer sides of the shaft core 61 to protect the shaft core 61. As shown in FIG. 4, the main body 10 is further provided with two stop blocks 80, and in the direction F, the two stop blocks 80 are respectively located on both sides of the shaft core 61 to encapsulate the shaft core 61 inside the main body 10.

For example, a material of the stop block 80 is the same as a material of the main body 10. In this way, the overall color of the casing of the main body 10 can be guaranteed to be uniform when colored and more beautiful.

For example, as shown in FIG. 1 to FIG. 3, the cover body 20 is provided with a notch 23 to facilitate the user to open the cover body. The notch 23 is provided on an outer periphery of the cover body 20 and is located at an end, away from the connecting member 70, of the cover body 20.

For example, as shown in FIG. 2, in the case where the cover body 20 is covered on the main body 10, the cover body 20 and the main body 10 overlap with each other, for example, completely overlap with each other. For example, as shown in FIG. 3, when the cover body 20 is opened relative to the main body 10 and the opening angle of the second display screen 40 relative to the first display screen 30 is 180°, the cover body 20 and the main body 10 may be located substantially in the same plane.

For example, the first display screen 30 and the second display screen 40 may be liquid crystal display panels, organic light emitting diode (OLED) display panels, or the like.

For example, the first display screen 30 and/or the second display screen 40 may further have a touch function, that is, the first display screen 30 and/or the second display screen 40 may be a touch display panel.

For example, the display device 1 can be applied to any product or component having a display function, such as a mobile phone, a smart watch, a smart bracelet, a smart necklace, a tablet computer, a notebook computer, and the like.

In the present embodiment, the display device 1 further includes a circuit board, the circuit board is disposed in the main body 10, and the first display screen 30 and the second display screen 40 are both electrically connected to the circuit board. For example, the controller may be disposed on the circuit board.

For example, the display device 1 further includes a battery, and the battery is electrically connected to the circuit board. The battery is used to provide power to the display device. For example, the battery may be a disposable battery, a rechargeable battery, a lithium battery, a fuel cell, or the like.

It should be noted that other components of the display device 1 (for example, a control device, an image data encoding/decoding device, a gate driver, a clock circuit, etc.) are all understood by those skilled in the art and are included, will not be repeated here, and should not be taken as a limitation on the present disclosure.

Some embodiments of the present disclosure further provide a terminal device. For example, the terminal device may be a mobile terminal device, a wearable device, or the like. The terminal device may include the display device described in any of the foregoing embodiments, that is, the display device provided in the present embodiment may be applied to the mobile terminal device, the wearable device, and the like. By providing a structure of the cover body 20, the main body 10 and other related components under the cover body 20 can be protected, and by setting the second display screen 40 on the cover body 20 to be a transparent display screen, the first display screen 30 under the cover body 20 can be always seen through the second display screen 40, thereby achieving the effect of convenient use, and being able to display more effective content to bring a better user experience.

For example, the terminal device may be a mobile phone, a smart watch, a smart bracelet, a smart necklace, a tablet computer, a notebook computer, or any other product or component with a display function.

The above descriptions are merely preferred embodiments of the present disclosure and are not intended to limit the present disclosure. Any modification, equivalent replacement, or improvement made within the spirit and principle of the present disclosure shall be included in the protection scope of the present disclosure.

For the present disclosure, the following statements should be noted:

(1) The accompanying drawings of the embodiments of the present disclosure involve only the structure(s) in connection with the embodiment(s) of the present disclosure, and other structure(s) can refer to common design(s).

(2) In case of no conflict, the embodiments of the present disclosure and features in the embodiments can be combined with each other to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A display device, comprising a main body and a cover body rotatably connected to the main body,
    wherein the main body comprises a first display screen on a side, close to the cover body, of the main body,
    the cover body is provided with an accommodating cavity penetrating through the cover body in a direction perpendicular to the first display screen, the cover body comprises a second display screen in the accommodating cavity,
    the second display screen is stacked on the first display screen in the direction perpendicular to the first display screen, and the second display screen is a transparent display screen;
    wherein the cover body is provided with a notch, the notch is provided on an outer periphery of the cover body, and is located at an end of the cover body away from a part, connected to the main body, of the cover body;
    the display device further comprises a camera provided on the main body,
    wherein a through hole is formed on the cover body at a position corresponding to the camera, in a case where the cover body is covered on the main body, the through hole exposes the camera,
    the through hole is located at an end of the cover body away from a part, where the notch is located, of the cover body.

2. The display device according to claim 1, further comprising a controller,
    wherein the controller is provided on the main body, the controller is in communication with the first display screen and the second display screen, and the controller is configured to control the first display screen and the second display screen to be able to display different contents, respectively.

3. The display device according to claim 1, wherein a shape of the through hole matches a shape of the camera, and a size of the through hole is larger than a size of the camera.

4. The display device according to claim 1, wherein a display region of the first display screen comprises a main display region, and in a case where the cover body is covered on the main body, an orthographic projection of a display region of the second display screen on the main body at least partially overlaps with the main display region.

5. The display device according to claim 4, wherein in the case where the cover body is covered on the main body, an orthographic projection of an outer periphery of the display region of the second display screen on the main body is located outside an outer periphery of the main display region of the first display screen.

6. The display device according to claim 5, wherein a shape of the display region of the second display screen is identical with a shape of the main display region of the first display screen.

7. The display device according to claim 1, wherein the cover body is pivotally connected to the main body.

8. The display device according to claim 7, wherein the cover body is pivotally connected to the main body through a damping shaft.

9. The display device according to claim 8, wherein the damping shaft comprises a shaft sleeve mounted on one of the cover body and the main body and a shaft core mounted on the other of cover body and the main body,
    the shaft sleeve is rotatably sleeved with the shaft core, and
    the shaft sleeve forms an interference fit with the shaft core.

10. The display device according to claim 9, wherein the main body is further provided with stop blocks, the stop blocks are located on both sides of the shaft core to encapsulate the shaft core inside the main body.

11. The display device according to claim 10, wherein a material of the stop blocks is identical with a material of the main body.

12. The display device according to claim 7, wherein the cover body is rotated relative to the main body in the direction perpendicular to the first display screen, or the cover body is rotated relative to the main body in a direction parallel to the first display screen.

13. The display device according to claim 12, wherein a rotation angle of the cover body relative to the main body is from 0° to 180°.

14. The display device according to claim 12, wherein a rotation angle of the cover body relative to the main body is from 0° to 360°.

15. The display device according to claim 1, wherein a material of the cover body is identical with a material of the main body.

16. The display device according to claim 1, further comprising a circuit board,
where the circuit board is in the main body, and the first display screen and the second display screen are both electrically connected to the circuit board.

17. The display device according to claim 2,
wherein a display region of the first display screen comprises a main display region, and in a case where the cover body is covered on the main body, an orthographic projection of a display region of the second display screen on the main body at least partially overlaps with the main display region.

18. A terminal device, comprising a display device,
wherein the display device comprises a main body and a cover body rotatably connected to the main body,
the main body comprises a first display screen on a side, close to the cover body, of the main body,
the cover body is provided with an accommodating cavity penetrating through the cover body in a direction perpendicular to the first display screen, and the cover body comprises a second display screen in the accommodating cavity,
the second display screen is stacked on the first display screen in the direction perpendicular to the first display screen, and the second display screen is a transparent display screen;
wherein the cover body is provided with a notch, the notch is provided on an outer periphery of the cover body, and is located at an end of the cover body away from a part, connected to the main body, of the cover body;
the display device further comprises a camera provided on the main body,
wherein a through hole is formed on the cover body at a position corresponding to the camera, in a case where the cover body is covered on the main body, the through hole exposes the camera,
the through hole is located at an end of the cover body away from a part, where the notch is located, of the cover body.

19. The terminal device according to claim 18, wherein the terminal device is a wearable device.

* * * * *